July 28, 1931. G. VIARD 1,816,663
DIAPHONOMETRIC MEANS
Filed Nov. 21, 1927    3 Sheets-Sheet 1
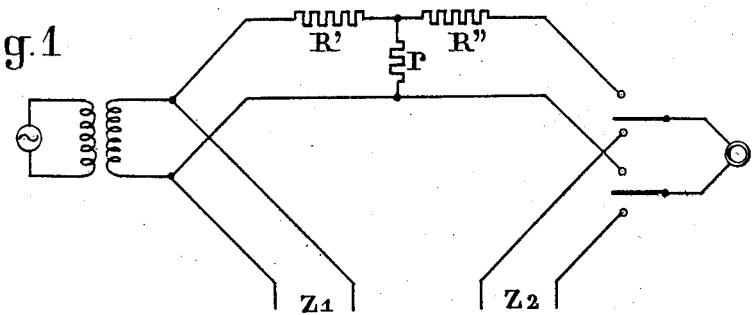
Fig. 1
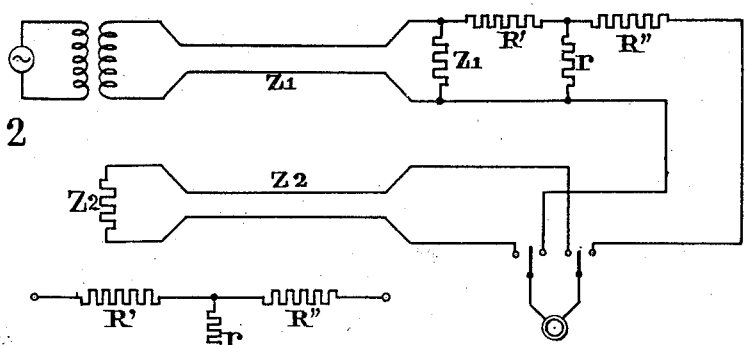
Fig. 2
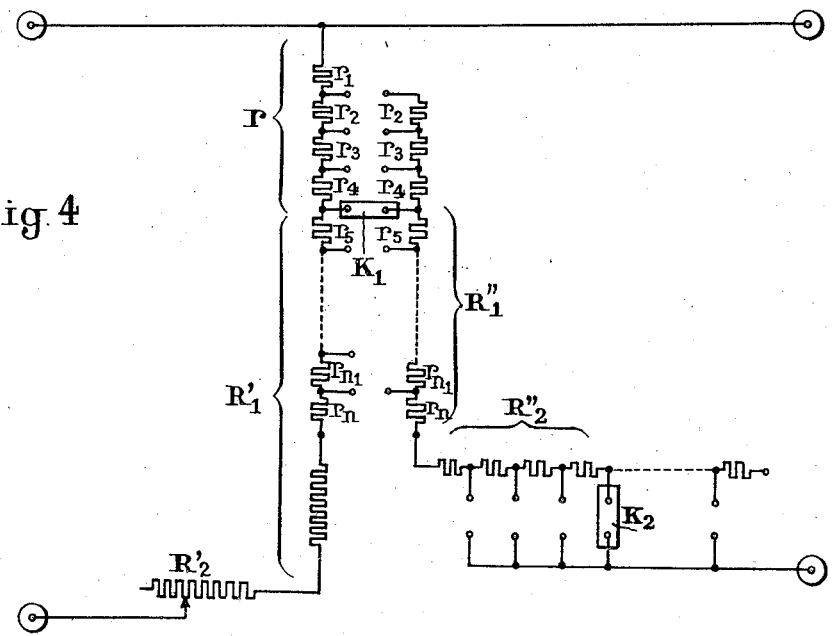
Fig. 3
Fig. 4
Inventor
George Viard
By
Pennie, Davis, Marvin Edmonds
Attorneys Patented July 28, 1931

1,816,663

UNITED STATES PATENT OFFICE

GEORGES VIARD, OF PARIS, FRANCE

DIAPHONOMETRIC MEANS

Application filed November 21, 1927, Serial No. 234,636, and in France November 25, 1926.

The invention relates to means which serve to measure the intensity of the mixture of conversations or "cross talk" resulting from the vicinity of a perturbing telephone circuit and a perturbed telephone circuit. The means, more particularly defined and forming the subject of the present invention, has a very extended scale of attenuation varying by very small amounts; it enables measurements of diaphony or "cross talk" in very different circuits and at different frequencies to be made by providing a generator at one end of the perturbing circuit and a receiver at the corresponding end of the perturbed circuit, or by placing a generator at one of the ends of the perturbing circuit and a receiver at the opposite end of the perturbed circuit.

It is known that the attenuation B corresponding to the diaphony between two lines is equal to the attenuation $b$ of the quadripole formed by the emitting end of the perturbing line and the receiving end of the perturbed line, the lines being terminated at the other ends by their characteristic impedances ($Z_1$ and $Z_2$).

For measuring this attenuation there is applied the same voltage $V_1$ at the origin of the perturbing line and at the entrance to a comparative network with a variable attenuation; by means of a receiver impedance $Z_r$ listening takes place alternately at the outlet from this network and at the receiving end of the perturbed line; the attenuation of the network is varied until the same intensity of sound is obtained at the two positions and consequently the same tension at the terminals of the receiver.

The attenuation B is given by the equation:

$$B = b' + \log_e \left| \sqrt{\frac{Z_2}{Z_1}} \right| + \log_e \left| \frac{Z_R + Z_b}{Z_R + Z_2} \right|$$

$Z_b$ being the impedance of the comparative network looking from the receiver towards the generator, the network terminals on the side of the generator being considered short circuited.

$b'$ being the attenuation read directly on the comparative network after adjusting the two sounds to equality.

$$\log_e \left| \sqrt{\frac{Z_2}{Z_1}} \right|$$

is a correction to be made subject to this reading; this correction is zero when the two lines are of the same type ($Z_2 = Z_1$).

$$\log_e \left| \frac{Z_R + Z_b}{Z_R + Z_2} \right|$$

is a term which may be made zero or sufficiently small so as to be negligible. For this purpose it is possible:

1. To make $Z_b = Z_2$.
2. To make $Z_R$ large relatively to $Z_b$ and to $Z_2$.
3. To make at the same time $Z_b$ to be substantially equal to $Z_2$, and $Z_R$ large relatively to $Z_b$ and to $Z_2$.

The comparative network employed is formed as a dissymmetric T constituted by resistances in series R', R" and a shunt resistance $r$.

It is known that in this case the attenuation $b'$ given by the apparatus is rigorously equal to:

$$b' = \log_e 2 \frac{R' + r}{r}$$

while the impedance $Z_b$ is equal to:

$$Z_b = R'' + \frac{rR'}{r + R'}$$

These equations are derived on the assumption that the input terminals of the network are short circuited. In practice this condition will always hold approximately due to the fact, pointed out below, that the input impedance of the network is always high compared to the impedance of the line or generator to which it is connected, being of the order of twenty times such impedance.

The object of the present invention is to determine a dissymmetric T responding to certain conditions set out below.

Figure 1 is a diagrammatic view showing a generator at one end of the perturbing circuit and a receiver at the corresponding end of the perturbed circuit.

Figure 2 is a diagrammatic view similar to that in Figure 1 in which the receiver is placed at the opposite end of the perturbed circuit.

Figure 3 shows diagrammatically a comparative network in the form of a dissymmetric T.

Figure 4 shows diagrammatically a resistance in series of the dissymmetric T decomposed into two parts.

Figure 5:
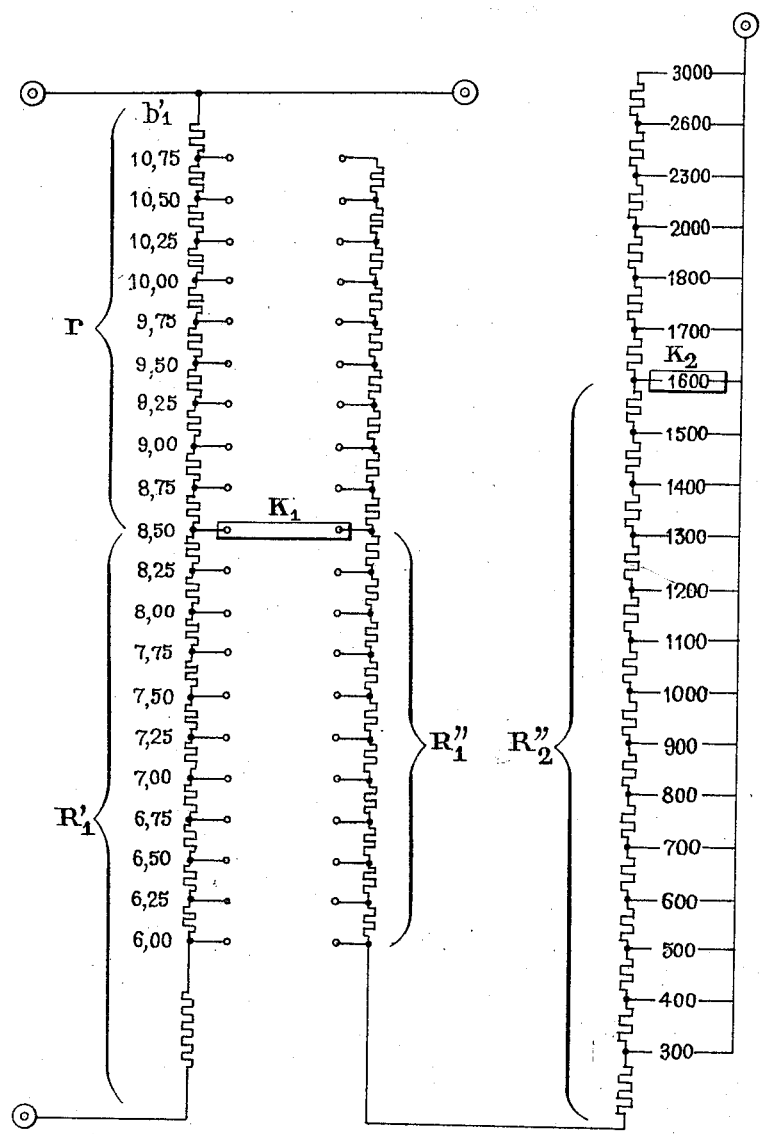
Figures 5 and 6 show two forms of carrying out the invention.

The conditions to which the dissymmetric T is adapted to respond, as set out below, are the following:

1. The scale of the variation of the attenuation $b'$ is large, it extends approximately from $b'=6.0$ to $b'=11.0$ and it is possible to vary $b'$ by very small amounts; it should thus be possible to obtain a large number of different values of attenuation; it is not practicable to obtain these values by means of a single commutator; but on the contrary with two commutators each with 20 tapping points, which are of a known type, it is possible to obtain 399 different values of attenuation.

It is therefore advantageous to be able to consider $b'$ as the sum of two terms $b'_1$ and $b'_2$, each of which is capable of varying independently of the other; $b'_1$ varies by amounts of a sufficiently large value, and $b'_2$ gives intermediate variations.

2. In the case of measurements of diaphony with a generator and receiver at the opposite ends (Figure 2) the perturbing line should be closed at the end opposite to the generator at its characteristic impedance $Z_1$; it is in shunt with this impedance that there is placed the inlet of the diaphonometric means of which the inlet impedance should be large relatively to $Z_1$, for example 20 times larger; and it should vary within limits as narrow as possible; as for the circuits used the characteristic impedance may reach 3,000 ohms, the inlet impedance should at least be equal to 60.000 ohms.

3. The impedance $Z_b$ of the dissymmetric T seen from the side of the receiver towards the side of the generator, the latter amounting to a substantial short circuit owing to its low impedance compared to the input impedance of the network, should be equal to the characteristic impedance $Z_2$ of the perturbed circuit, to permit the measurements on the circuits actually used, this impedance should be capable of varying from about 300 to 3,000 ohms.

The two terms $b'_1$ and $b'_2$ of which the sum should be equal to $b'$ should have variations independent of one another, that is to say that the expression:

$$e^{b'} = 2\frac{R'+r}{r}$$

should be capable of being decomposed into two factors each of which contains a single independent variable.

In the existing apparatus manufacturers have adopted a shunt resistance $r$ which is very small relatively to the series resistance $R'$; $R'$ is varied so as to obtain large variations of $b'$ and $r$ for obtaining intermediate variations. The resistance $R'$ and consequently the inlet impedance of the apparatus constructed in accordance with this principle varies considerably with the value of attenuation, which is to be avoided for the measurement of diaphony with a generator and receiver at opposite ends.

One of the characteristic features of the present invention resides in the fact that the large variations of $b'$ are obtained by varying the shunt resistance $r$ and the small intermediate variations are obtained by varying the series resistance $R'$.

This process only requires small variations of the series resistance $R'$ which remains within practical limits; this restricts the amplitudes of the variations of the inlet impedance with the value of attenuation. Calculation shows that this is possible without any approximation and enables the values of the resistances of T to be determined.

It has been seen that:

$$b' = \log_e 2\frac{R'+r}{r}$$

the resistances $(R'-r)$ and $r$ being both variable.

The resistance $R'$ is composed of two parts $R'_1$ and $R'_2$; $R'_1$ being such that whatever the value of $b'$, $R'_1+r$ will always be constant.

Consequently:

$$b' = \log_e 2\left[\frac{R'_1+r+R'_2}{r}\right]$$
$$= \log_e 2\left[\frac{R'_1+r}{r}\right]\left[1+\frac{R'_2}{R'_1+r}\right]$$

Thus, $b'$ is the sum of two terms $b'_1$ and $b'_2$; the variation of $b'_1$ only depends upon the variation of $r$; the variation of $b'_2$ only depends upon the variation of $R'_2$.

From this there are immediately obtained the values of $r$ and of $R'_2$ $$b'_1 = \log_e 2\left[\frac{R'_1+r}{r}\right];$$

so that $r = 2(R'_1+r)e^{-b'_1}$ $$b'_2 = \log_e\left[1+\frac{R'_2}{R'_1+r}\right];$$

so that $R'_2 = (R'_1+r)(e^{b'_2}-1)$ $(R'_1 + r)$ is in a manner very close to the minimum inlet impedance of the dissymmetric T; in the example it has been given the value 60,000 ohms; but it may have any value sufficiently large relatively to $Z_1$.

The dissymmetric T thus satisfies the first two conditions imposed; the third condition is that the impedance $Z_b$ from the receiver side towards the generator side, this being short circuited, has a value as near as possible to the impedance $Z_2$ of the perturbed circuit.

It has been seen that:

$$Z_b = R'' + \frac{rR'}{r+R'} = R'' + r - \frac{r^2}{r+R'}$$

By reason of the values of attenuation which should be obtained, $$\frac{r^2}{r+R'}$$

is always negligible relatively to $R'' + r$ and it may be admitted with a large approximation:

$$Z_b = R'' + r$$

The shunt resistance $r$ varies when $b'_1$ varies; but it should be possible to give to $Z_b$ any value $Z_2$, this irrespective of the value of $b'$ and consequently of the value of $r$. For this purpose the procedure, in accordance with the invention is as shown diagrammatically in Figure 4 in which the resistance $R''$ is decomposed into two portions $R''_1$ and $R''_2$; the element $R''_1$ is such that the sum $(R''_1 + r)$ is constant and equal to the greatest value which can be attained by $r$. There is therefore obtained:

$$Z_b = (R''_1 + r) + R''_2.$$

The variation of $Z_b$ therefore only depends upon the variation of $R''_2$; it is independent of the variation of $r$ and consequently of $b$. It is therefore possible to readily give to $Z_b$ any value $Z_2$.

Figure 6:
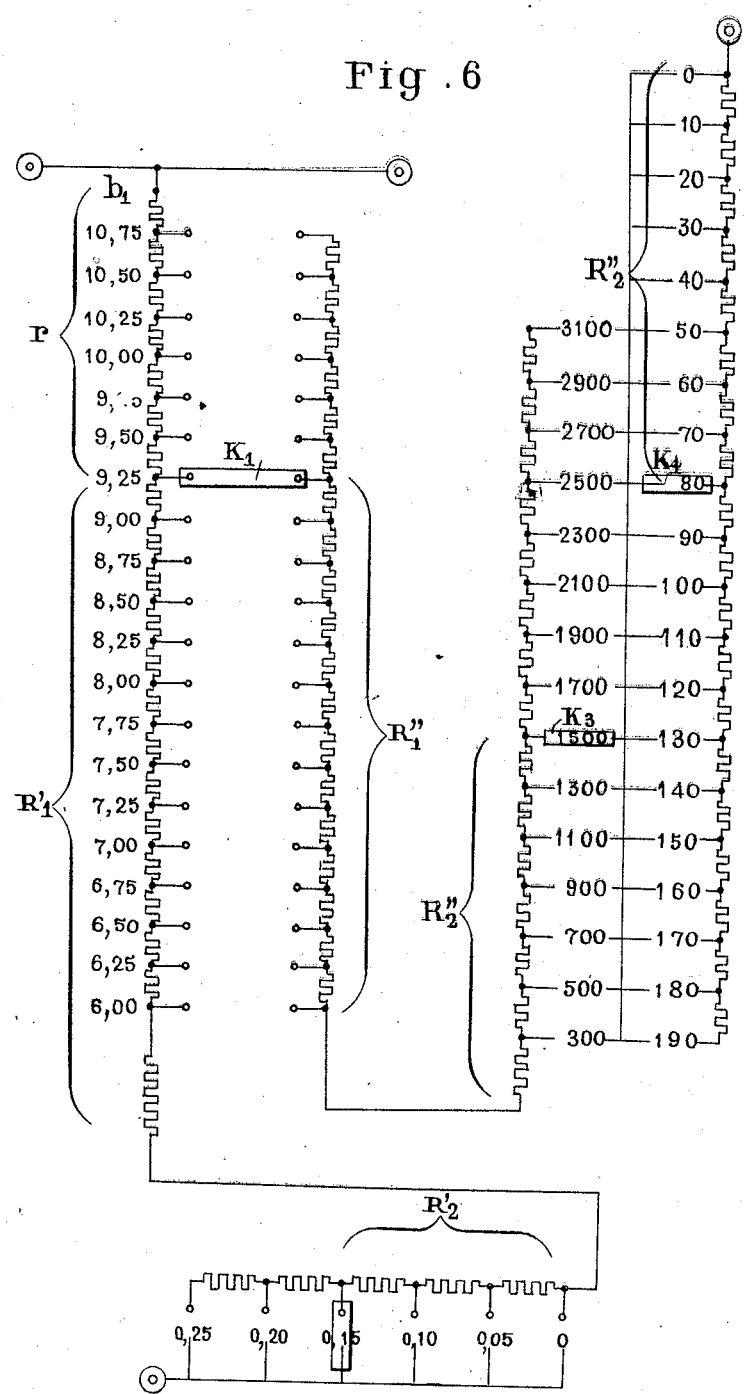

The characteristic features of the invention have been applied by way of example to each of the two forms of construction of the invention shown diagrammatically in Figures 5 and 6.

In the case of Figure 5 the series resistance $R'$ is reduced to the element $R'_1$, the resistance $R''$ is subdivided into $R''_1$ and $R''_2$. A suitable calibration of the resistances $R'_1$ and $r$ permits of obtaining, by the displacement of the commutator with 20 tapping points $K_1$ by amounts of 0.25 as is indicated by the scale of attenuation values $b'$ marked along the resistances: the constant value of $R'_1 + r$ is equal to 60,000 ohms.

The variation of the impedance $Z_b$ is controlled by the commutator with 20 tapping points $K_2$ which permits of obtaining successively the following values: 300, 400, 500, 600, 700, 800, 900, 1,000, 1,100, 1,200, 1,300, 1,400, 1,500, 1,600, 1,700, 1,800, 2,000, 2,300, 2,600, 3,000.

The form of construction of the apparatus for the measurement of cross talk illustrated diagrammatically in Figure 6 enables $b'$ to be varied by amounts of 0.25 by means of the commutator with 20 tapping points $K_1$, and $b'_2$ to be varied by amounts of 0.05 by means of a commutator with 6 tapping points $K_2$.

The variation of the impedance $Z_b$ is controlled by means of commutators $K_3$ and $K_4$ having respectively 15 and 20 tapping points. The first enables $Z_b$ to be varied from 300 to 3,100 ohms by amounts of 200 ohms; the second gives variation of an amplitude of 10 ohms.

The adaptation of $Z_b$ to $Z_2$ cannot be effected perfectly as $Z_b$ varies in a discontinuous manner; calculation however shows that for a receiver with an impedance $Z_R = 2,000$ ohms for example, the error $$\log_e \frac{Z_R + Z_b}{Z_R + Z_2}$$

is in the most unfavourable case, less than the smallest reading which it is possible to make with the apparatus.

The error is, therefore, the smaller the greater the impedance of the receiver and it is possible to usefully employ not only a receiver of greater impedance ($Z_R = 4,000$ ohms for example) but an amplifier or a receiver of relatively low impedance connected to the diaphonometric device by means of a transformer, with or without a screen and such that the impedance of the receiver from the device across the transformer is increased.

The resistances employed in the device are resistances without self induction or capacity.

It will be understood that with these diaphonometric means it is possible to utilize all the usual arrangements for ensuring symmetry; in particular the resistance $R'_1$ may be divided in two parts and symmetrically distributed over each side of the resistance $r$; the same applies to the resistance $R'_2$ which should then be divided in two parts and symmetrically distributed over each side of the resistance $r$. In the example shown in Figure 6 it is possible, in this case, to vary the resistance by means of a commutator with 12 tapping points. As with existing diaphonometers it is possible to make measurements between two side circuits or between a side circuit and a phantom circuit; it is possible to employ in this latter case any usual method of combination of circuits such as repeating coils and resistances.

It will be understood that the forms of construction illustrated have only been given by way of example. The values of the resistances, the number of tapping points of the commutators, for example, may be different; the resistances may be placed in a different manner relatively to one another; $R'_2$ may for example be interposed between the unvarying part and the variable part of the resistance $R'_1$ on condition that the resistances which are not used are short circuited, etc.

In a more general manner the principle of the attenuation network may be applied to any logarithmic potentiometer of which the inlet resistance should be large without being entirely constant and which should have a large number of different values of $$\log_e \frac{V_1}{V_2};$$

large values of $$\log_e \frac{V_1}{V_2}$$

are obtained in this application by the variation of the shunt resistance $r$, whilst the intermediate variations are obtained by small variations of the series resistance $R''_1$.

Having thus described my invention, what I claim as new and desire to secure by Letters Patent is:—

1. An electrical attenuator comprising a network formed of series and shunt elements interposed between a pair of input and a pair of output terminals, and means for simultaneously varying said shunt and certain of said series elements in equal and opposite amounts for adjusting the attenuation over a wide range of values while maintaining substantially constant the terminal impedances of said attenuator.

2. An electrical attenuator comprising a network formed of series and shunt elements interposed between a pair of input and a pair of output terminals, said attenuator presenting a high input impedance compared to its output impedance, and means for simultaneously adjusting certain of said series and said shunt elements in equal and opposite amounts for varying the attenuation over a wide range of values while maintaining substantially constant said input and output impedances.

3. An electrical attenuator comprising a network formed of series and shunt elements interposed between a pair of input and a pair of output terminals, said input terminals presenting a high impedance compared to said output terminals, means for simultaneously adjusting certain of said series and said shunt elements in equal and opposite amounts in successive steps for varying the attenuation over a wide range of values while maintaining said terminal impedance substantially constant, and additional means for adjusting certain of said series elements in successive steps for obtaining variations of attenuation intermediate to those first mentioned without appreciably affecting said terminal impedances.

4. An electrical attenuator comprising a network formed of series and shunt elements interposed between a pair of input and a pair of output terminals, said input terminals presenting a high impedance compared to said output terminals, means for simultaneously adjusting said series elements connected to said output terminals and said shunt element in equal and opposite amounts in successive steps for varying the attenuation over a wide range of values while maintaining said terminal impedance substantially constant, additional means for adjusting certain of said series elements in successive steps for obtaining variations of attenuation intermediate to those first mentioned, and means for adjusting certain other of said series elements for varying said output terminal impedance substantially independent of said attenuation.

5. An electrical attenuator comprising series and shunt resistances connected to form a dissymmetric T network interposed between input and output terminals, and means for simultaneously adjusting said shunt and said series output resistance in equal and opposite amounts for varying the attenuation over a wide range of values while maintaining substantially constant the terminal impedances of said attenuator.

6. An electrical attenuator comprising series and shunt resistances connected to form a dissymmetric T network interposed between input and output terminals, said attenuator having a high input impedance compared to its output impedance, and means for simultaneously adjusting said shunt and said series output resistances in equal and opposite amounts for varying the attenuation over a wide range of values while maintaining said input and output impedances substantially constant.

7. An electrical attenuator composed of resistances connected to form a dissymmetric T network interposed between input and output terminals, said resistances being selected to provide a high input impedance compared to the output impedance of said attenuator, means for simultaneously adjusting said shunt and said series output resistances in equal and opposite amounts in successive steps for varying the attenuation over a wide range of values while maintaining said output impedance substantially constant, and means for individually adjusting the series arm of said T associated with said input terminals for varying the attenuation in steps intermediate to those first mentioned.

8. An electrical attenuator composed of resistances connected to form a dissymmetric T network interposed between input and output terminals, said resistances being selected to provide a high input impedance compared to the output impedance of said attenuator, means for simultaneously adjusting said shunt and said series output resistances in equal and opposite amounts in successive steps for varying the attenuation over a wide range of values while maintaining said input and output impedances substantially constant, means for individually adjusting the series arm of said T associated with said input terminals for varying the attenuation in steps intermediate to those first mentioned, and means for adjusting the series arm associated with said output terminals for varying the output impedance substantially independent of said attenuation.

9. Method of measuring crosstalk between a disturbed and a disturbing line by employment of a dissymmetric T or H attenuating network consisting of series and shunt arms, which comprises, applying a signal to the disturbing line and to said network, receiving said signal upon an indicator connected alternately to the disturbed line and to said network, adjusting said network to present a high impedance to said signal source for the purpose of eliminating error in measurement, adjusting said network further to present an impedance to said indicator approximating that of said disturbed line, and simultaneously adjusting the shunt arm and the series arms of said network connected to said indicator in equal and opposite amounts to vary the attenuation thereof while maintaining substantially constant the impedance presented to said indicator, whereby a signal balance is attained without appreciable error in measurement as indicated by the adjustment of said network.

10. Method of measuring crosstalk between a disturbed and a disturbing line by employment of a dissymmetric T or H attenuating network consisting of series and shunt arms, which comprises, applying a signal to the disturbing line and to said network, receiving said signal upon an indicator connected alternately to the disturbed line and to said network, adjusting said network to present to said signal source an impedance sufficiently high to substantially eliminate error in measurement due to the impedance through which said signal is supplied, adjusting said network further to present an impedance to said indicator approximating that of said disturbed line, and simultaneously adjusting in equal and opposite amounts the shunt arm and the series arms of said network connected to said indicator to vary the attenuation thereof while maintaining substantially constant the impedance presented to said indicator, whereby a signal balance is attained without appreciable error in measurement as indicated by the adjustment of said network.

11. Method of measuring crosstalk between a disturbed and a disturbing line by employment of a dissymmetric T or H attenuating network consisting of shunt and series arms, which comprises, applying a signal to the disturbing line and to said network, receiving said signal upon an indicator connected alternately to the disturbed line and to said network, adjusting said network to present a high impedance to the impedance through which said signal is supplied for eliminating error in measurement, adjusting said network further to present to said indicator an impedance approximating that of said disturbed line, and simultaneously adjusting said shunt and the series arm of said network connected to said indicator in relatively large equal and opposite finite steps for varying the attenuation of said network correspondingly while maintaining constant the impedance presented to said indicator, whereby an approximate signal balance is attained, and adjusting the series arm connected to said signal source in relatively small steps to vary the attenuation in such manner as to attain an exact signal balance without the introduction of error in measurement.

GEORGES VIARD.